METHOD OF MANUFACTURING MAGNETIC HEADS WITH
BONDING GAP-FILLING MATERIALS

Filed May 3, 1963

INVENTORS
HANS P. PELOSCHEK
MATTHIJS H.M. VROLIJKS
BY
Frank R. Trifari
AGENT

United States Patent Office 3,246,383
Patented Apr. 19, 1966

3,246,383

METHOD OF MANUFACTURING MAGNETIC HEADS WITH BONDING GAP-FILLING MATERIALS

Hans Peter Peloschek and Matthijs Henricus Maria Vrolijks, Emmasingel, Eindhoven, Netherlands, assignors to North American Philips Company, Inc., New York, N.Y., a corporation of Delaware Filed May 3, 1963, Ser. No. 277,829
Claims priority, application Netherlands, May 8, 1962, 278,197; Jan. 29, 1963, 288,321
15 Claims. (Cl. 29—155.5)

The invention relates to a method of manufacturing parts of annular magnetic heads for recording, reproducing or erasing magnetic recordings. It relates in particular to such heads which comprise at least two circuit parts of sintered oxidic ferromagnetic material, a very short gap filled with nonmagnetic material being located between confronting surfaces of the circuit parts; the nonmagnetic material also serves to bond the circuit parts together. Magnetic heads with very short gaps having lengths varying between 1 and 20 microns are difficult to manufacture since close tolerances are usually imposed on the length of gap and the nonmagnetic material in the gap must have a good resistance to detrition and must be capable of being readily processed; in addition, the process of manufacture should be as economical and simple as possible. The gap material also must be as homogeneous as possible. It is a primary object of the invention to provide a method of manufacturing magnetic heads with very short gap lengths which is comparatively simple to perform while achieving close tolerances for gap length.

According to one aspect of the invention, at least two parts of sintered oxidic ferromagnetic material having gap-confronting surfaces are placed in confronting relationships with the inter-position of spacing members having a thickness equal to the desired gap length; then a quantity of glass or enamel in the form of grains, powder or a coherent rod or plate is placed adjacent to the gap or gaps thus formed, the maximum melting point of said glass or enamel being 900° C., after this, the assembly is heated up to the melting temperature of the glass or enamel and then, after cooling, the whole block is mechanically split into a number of head parts having the desired gap width.

In order to prevent the liquid enamel from flowing between the spacing members and the parts, according to an embodiment of the invention the parts may be pressed together with a slight pressure during heating.

According to another aspect of the invention, each of the parts is heated for a short period of time at a temperature of from 800–1000° C. before the surfaces are placed in confronting relationship. As a result of this the surfaces are thermally etched so that the bond of the glass or enamel to the surface is further improved.

In another embodiment, at least one of the gap-confronting surfaces is provided with a shallow groove in which the glass or enamel is laid against the gap or gaps.

The invention also comprises a magnetic head when manufactured by any one or more of the above methods.

Figure 1:
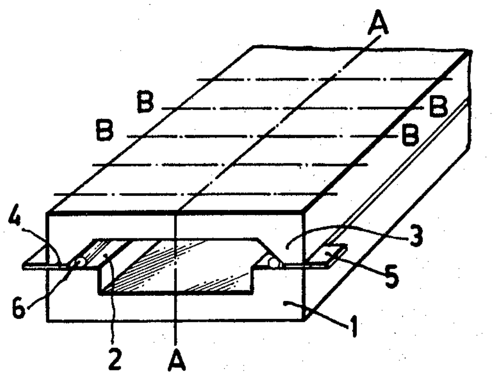
Figure 3:
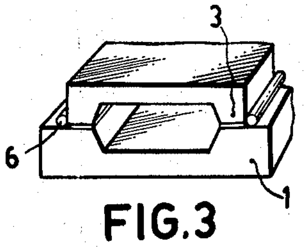
Figure 4:
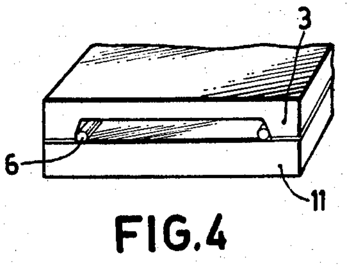
Figure 2:
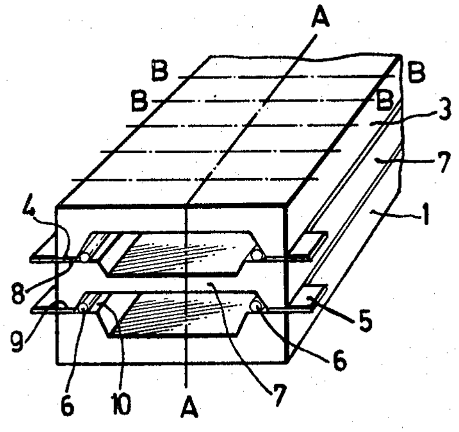

In order that the invention may readily be carried into effect, certain embodiments thereof will now be described more fully, by way of example, with reference to the accompanying drawing, in which FIG. 1 shows two channel-shaped circuit parts and one step in the process of manufacture;

FIG. 2 shows three circuit parts and the same step in the manufacturing process; and FIGS. 3, 4, 5, 6, 7 and 8 show several other suitably-shaped parts together with alternative locations of the nonmagnetic gap-filling and bonding material in the same step.

In the drawing, reference numeral 1 designates a channel-shaped part consisting of sintered oxidic ferromagnetic material which is provided with polished surfaces 2. A part 3, similarly shaped, having polished surfaces 4 which may have a smaller width than the surfaces 2, is placed on the part 1 with the interposition of spacing members 5 which have a thickness equal to the length of the desired gap. These spacing members may be made, for example, from mica or beryllium copper. Both parts 1 and 3, after polishing the surfaces 2 and 4 but before placing together, are preferably heated to 800–1000° C. for a short period of time, as a result of which the surfaces 2 and 4 are thermally etched. After placement of the parts, a rod 6 composed of enamel is laid on the surfaces 2 adjacent to the gap and then the assembly is heated under a slight pressure so that the enamel melts. As a result of the capillary action of the gap the liquid enamel is forced into the gap, a gap filling then being obtained which is entirely free from inclusions, for example air bubbles. After cooling, the block is sawed into parts along the lines A—A and B—B which may serve as parts of annular magnetic heads.

Good results were obtained with an enamel of the following compositon: (in percent by weight): $SiO_2$ 16%, $B_2O_3$ 14%, ZnO 10% and PbO 60%.

FIGURE 2 shows a block from which parts for multi-track magnetic heads may be obtained. The channel-shaped parts 1 and 3 in this case are not placed directly upon each other but an I-shaped part 7 is interposed which has polished surfaces 8 and 9, the surface 8 again having a larger width than the surface 4 but the surface 9 having a smaller width than the surface 10. In the same manner as described for FIGURE 1, the parts are bonded together and after the bonding they are split into separate parts. Of course, several intermediate members 7 may be used for co-action with more tracks.

Figure 5:
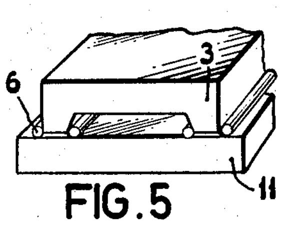
Figure 6:
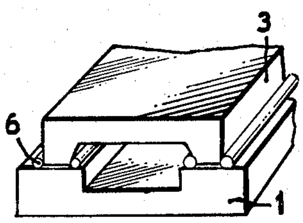

FIGURES 3 to 6 show two parts 1 and 3 having cross-sections different from those shown in FIGURES 1 and 2. These parts also are bonded together in the manner described for FIG. 1. In this case the lower part 1 may be channel-shaped and may be wider than the upper part 3, the enamel then being placed on the outside (FIGURE 3); the lower part 11 may be flat and as wide as part 3, the enamel being placed on the inside (FIGURE 4), or the flat part 11 may be wider than the part 3, so that the enamel may be located both on the inside and the outside (FIG. 5).

In FIGURE 6, part 1 is again wider than part 3 and the gap-bounding surfaces are also wider. The enamel may be placed both on the outside and on the inside adjacent to the gap.

Figure 7:
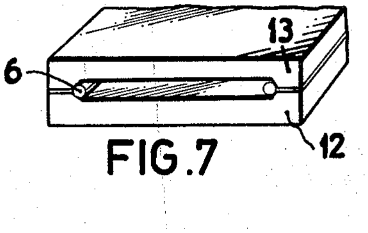

In FIGURE 7 the two parts 12 and 13 have the same dimensions and the gap-bounding surfaces are equal in width. The channel depth in both parts is so small that the rods may be placed on the inside adjacent to the gaps.

Figure 8:
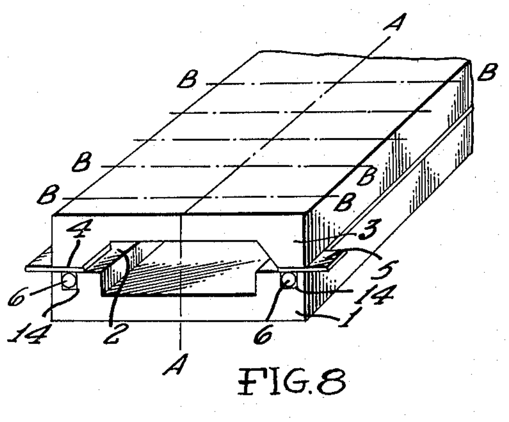

In the embodiment of FIG. 8, a groove 14 is provided in the two surfaces of part 1, the glass rod 6 being placed in groove 14.

As a fusible material, glass may be used instead of enamel. In addition, it is to be noted that the fusible materials need not be only in rod-form; they may, for example, take the form of powder, grains, a narrow plate, or the like. Regardless of the form of the fusible material, the action is the same: upon melting, the molten material is forced into the gap by capillary action.

While the invention has been described with respect to specific embodiments, modifications and variations thereof will be readily apparent to those skilled in the art without departing from the inventive concept, the scope of which is set forth in the appended claims.

What is claimed is:

1. A method of manufacturing portions of magnetic heads composed of two magnetic circuit parts consisting of sintered oxidic ferromagnetic material and having confronting gap surfaces with a gap therebetween filled with a nonmagnetic material bonding the circuit parts together, comprising: placing spacing members having a thickness equal to the desired gap length at opposite ends of a first polished gap surface of one circuit part, placing a corresponding polished gap surface of a second circuit part on said spacing members in confronting relationship with said first surface thereby forming a gap between said surfaces, placing a quantity of nonmagnetic material adjacent to the gap, said nonmagnetic material having a melting temperature below that of said ferromagnetic material, and heating the resulting assembly to the melting temperature of said nonmagnetic material, whereby said nonmagnetic material melts, fills the gap by capillary action, and bonds the circuit parts together.

2. A method according to claim 1, wherein said nonmagnetic material is glass.

3. A method according to claim 1, wherein said nonmagnetic material is enamel.

4. A method according to claim 1, wherein pressure is applied to the assembly during the heating step.

5. A method of manufacturing portions of magnetic heads composed of two circuit parts consisting of sintered oxidic ferromagnetic material and having gap surfaces with a gap therebetween filled with a nonmagnetic material bonding the circuit parts together, comprising: heating the two circuit parts, cooling the two circuit parts, placing spacing members having a thickness equal to the desired gap length at opposite ends of a first polished gap surface of one circuit part, placing a corresponding polished gap surface of a second circuit part on said spacing members in confronting relationship with said first surface thereby forming a gap between said surfaces, placing a quantity of nonmagnetic material adpacent to the gap, said nonmagnetic material having a melting temperature below that of said ferromagnetic material, and heating the resulting assembly to the melting temperature of said nonmagnetic material, whereby said nonmagnetic material melts, fills the gap by capillary action, and bonds the circuit parts together.

6. A method of manufacturing portions of magnetic heads composed of two circuit parts consisting of sintered oxidic ferromagnetic material and having gap surfaces with a gap therebetween filled with a nonmagnetic material bonding the circuit parts together, comprising: placing spacing members having a thickness equal to the desired gap length at opposite ends of at least two polished gap surfaces of one circuit part, placing the corresponding polished gap surfaces of a second circuit part on said spacing members in confronting relationship with the gap surfaces of said one circuit part thereby forming gaps between said surfaces, placing a quantity of nonmagnetic material adjacent to the gaps, said nonmagnetic material having a melting temperature below that of said ferromagnetic material, and heating the resulting assembly to the melting temperature of said nonmagnetic material, whereby said nonmagnetic material melts, fills the gaps by capillary action, and bonds the circuit parts together, cooling the assembly, and then cutting the assembly along mutually perpendicular axes to form a plurality of head portions.

7. A method according to claim 6, wherein the circuit parts are heated and subsequently cooled prior to the placing of the spacing members.

8. A method according to claim 6, wherein said nonmagnetic material is glass.

9. A method according to claim 6, wherein said nonmagnetic material is enamel.

10. A method of manufacturing portions of magnetic heads composed of two circuit parts consisting of sintered oxidic ferromagnetic material and having confronting gap surfaces with a gap therebetween filled with a nonmagnetic material bonding the circuit parts together, comprising: placing a polished gap surface of one circuit part in confronting relationship with a corresponding polished gap surface of a second circuit part, said surfaces being separated by a gap equal to the desired gap length, placing a quantity of nonmagnetic material adjacent to the gap, said nonmagnetic material having a melting temperature below that of said ferromagnetic material, and heating the resulting assembly to the melting temperature of said nonmagnetic material, whereby said nonmagnetic material melts, fills the gap by capillary action, and bonds the circuit parts together.

11. A method according to claim 10, wherein said nonmagnetic material is glass.

12. A method of manufacturing portions of magnetic heads composed of two circuit parts consisting of sintered oxidic ferromagnetic material and having confronting gap surfaces with a gap therebetween filled with a nonmagnetic material bonding the circuit parts together, comprising: placing a polished gap surface of one circuit part in confronting relationship with a corresponding polished gap surface of a second circuit part, said surfaces being separated by a gap equal to the desired gap length, one of said surfaces having a shallow groove therein, placing a quantity of nonmagnetic material in said groove, said nonmagnetic material having a melting temperature below that of said ferromagnetic material, and heating the resulting assembly to the melting temperature of said nonmagnetic material, whereby said nonmagnetic material melts, fills the gap by capillary action, and bonds the circuit parts together.

13. A method of manufacturing portions of magnetic heads composed of two circuit parts consisting of sintered oxidic ferromagnetic material and having confronting gap surfaces with a gap therebetween filled with a nonmagnetic material bonding the circuit parts together, comprising: heating the two circuit parts, cooling the two circuit parts, placing spacing members having a thickness equal to the desired gap length at opposite ends of a first polished gap surface of one circuit part, placing a corresponding polished gap surface of a second circuit part on said spacing members in confronting relationship with said first surface thereby forming a gap between said surfaces, one of said surfaces having a shallow groove therein, placing a quantity of nonmagnetic material in said groove, said nonmagnetic material having a melting temperature below that of said ferromagnetic material, and heating the resulting assembly to the melting temperature of said nonmagnetic material, whereby said nonmagnetic material melts, fills the gap by capillary action, and bonds the circuit parts together.

14. A method of manufacturing portions of magnetic heads composed of two circuit parts consisting of sintered oxidic ferromagnetic material and having confronting gap surfaces with a gap therebetween filled with a nonmagnetic material bonding the circuit parts together, comprising: heating the circuit parts, cooling the circuit parts, placing a polished gap surface of one circuit part in confronting relationship with a corresponding polished gap surface of another circuit part, said surfaces being separated by a gap equal to the desired gap length, placing a quantity of nonmagnetic material adjacent to the gap, said nonmagnetic material having a melting temperature below that of said ferromagnetic material, and heating the resulting assembly to the melting temperature of said nonmagnetic material, whereby said nonmagnetic material melts, fills the gap by capillary action, and bonds the circuit parts together.

15. A method of manufacturing portions of magnetic heads composed of two circuit parts consisting of sintered oxidic ferromagnetic material and having confronting gap surfaces with a gap therebetween filled with a nonmagnetic material bonding the circuit parts together, comprising: thermally etching the gap surfaces of the two circuit parts, placing a polished gap surface of one circuit part in confronting relationship with a corresponding polished gap surface of another circuit part, said surfaces being separated by a gap equal to the desired gap length, placing a quantity of nonmagnetic material adjacent to the gap, said nonmagnetic material having a melting temperature below that of said ferromagnetic material, and heating the resulting assembly to the melting temperature of said nonmagnetic material, whereby said nonmagnetic material melts, fills the gap by capillary action, and bonds the circuit parts together.

References Cited by the Examiner

UNITED STATES PATENTS

| | | | |
|---|---|---|---|
| 2,346,555 | 4/1944 | Cobb | 29—155.5 |
| 2,728,054 | 12/1955 | Albers-Schoenberg | 336—178 |
| 3,079,470 | 2/1963 | Camaras | 179—100.2 |
| 3,094,772 | 6/1963 | Duinker | 29—155.59 |
| 3,117,367 | 1/1964 | Duinker | 29—155.5 |

WHITMORE A. WILTZ, *Primary Examiner.*

JOHN F. CAMPBELL, *Examiner.*